United States Patent
Shao et al.

(10) Patent No.: US 11,199,750 B2
(45) Date of Patent: Dec. 14, 2021

(54) DISPLAY PANEL HAVING BLACK MATRIX COMPRISING EXTENSION PORTIONS

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Xibin Shao, Beijing (CN); Lifeng Lin, Beijing (CN); Honglin Zhang, Beijing (CN); Hongming Zhan, Beijing (CN); Yu Ma, Beijing (CN); Kui Zhang, Beijing (CN); Chao Tian, Beijing (CN); Zhe Li, Beijing (CN)

(73) Assignees: FUZHOU BOE OPTOELECTRONICS TECHNOLOGY CO., LTD., Fuzhou (CN); BOE TECHNOLOGY GROUP CO., LTD., Beijing (CN)

( * ) Notice: Subject to any disclaimer, the term of this patent is extended or adjusted under 35 U.S.C. 154(b) by 243 days.

(21) Appl. No.: 16/373,943

(22) Filed: Apr. 3, 2019

(65) Prior Publication Data
US 2019/0227396 A1  Jul. 25, 2019

Related U.S. Application Data

(63) Continuation of application No. 15/571,141, filed as application No. PCT/CN2017/084040 on May 12, 2017, now Pat. No. 10,295,873.

(30) Foreign Application Priority Data

May 25, 2016 (CN) .......................... 201610354967.9

(51) Int. Cl.
G02F 1/1362 (2006.01)
G02F 1/1335 (2006.01)
G02F 1/1343 (2006.01)

(52) U.S. Cl.
CPC .... *G02F 1/136209* (2013.01); *G02F 1/13439* (2013.01); *G02F 1/133512* (2013.01);
(Continued)

(58) Field of Classification Search
CPC ................................................. G02F 1/136209
See application file for complete search history.

(56) References Cited

U.S. PATENT DOCUMENTS 6,022,646 A  2/2000  Kim et al.
6,099,993 A  8/2000  Kim et al.
(Continued)

FOREIGN PATENT DOCUMENTS

CN  101989015 A  3/2011
CN  102385206 A  3/2012
(Continued)

OTHER PUBLICATIONS

International Search Report & Written Opinion dated Aug. 11, 2017, regarding PCT/CN2017/084040.
(Continued)

*Primary Examiner* — Lex H Malsawma
*Assistant Examiner* — Xia L Cross
(74) *Attorney, Agent, or Firm* — Intellectual Valley Law, P.C.

(57) ABSTRACT

In accordance with some embodiments of the disclosure, an array substrate and a related liquid crystal display device are provided. The array substrate can include a plurality of pixel electrodes arranged on a base substrate, and a conductive opaque line arranged between two neighboring pixel electrodes and overlapping with each of the two neighboring pixel electrodes along a width direction of the conductive opaque line.

8 Claims, 9 Drawing Sheets

(52) U.S. Cl.
CPC .. *G02F 1/134336* (2013.01); *G02F 1/136286* (2013.01); *G02F 1/13629* (2021.01); *G02F 1/136218* (2021.01); *G02F 1/136222* (2021.01); *G02F 1/136295* (2021.01); *G02F 2201/121* (2013.01); *G02F 2201/123* (2013.01)

(56) References Cited

U.S. PATENT DOCUMENTS

| | | |
|---|---|---|
| 2003/0058377 A1* | 3/2003 | Chae ................. G02F 1/136213 349/43 |
| 2004/0263722 A1 | 12/2004 | Oh et al. |
| 2005/0259197 A1 | 11/2005 | Hirai et al. |
| 2007/0002246 A1 | 1/2007 | Chang et al. |
| 2011/0199568 A1 | 8/2011 | Morishita et al. |
| 2013/0106919 A1 | 5/2013 | Wang et al. |

FOREIGN PATENT DOCUMENTS

| | | |
|---|---|---|
| CN | 103715206 A | 4/2014 |
| CN | 205620654 U | 10/2016 |

OTHER PUBLICATIONS

Notice of Allowance in the U.S. Appl. No. 15/571,141, dated Jan. 18, 2019.
Non-Final Office Action in the U.S. Appl. No. 15/571,141, dated Oct. 4, 2018.
Response to Non-Final Office Action in the U.S. Appl. No. 15/571,141, dated Nov. 29, 2018.

* cited by examiner

DISPLAY PANEL HAVING BLACK MATRIX COMPRISING EXTENSION PORTIONS

CROSS-REFERENCES TO RELATED APPLICATIONS

This application is a continuation of U.S. application Ser. No. 15/571,141, filed May 12, 2017, which is a national stage application under 35 U.S.C. § 371 of International Application No. PCT/CN2017/084040, filed May 12, 2017, which claims priority to Chinese Patent Application No. 201610354967.9, filed on May 25, 2016. Each of the forgoing applications is herein incorporated by reference in its entirety for all purposes.

TECHNICAL FIELD

The present disclosure relates to the field of display technology and, more particularly, to an array substrate, and an LCD device.

BACKGROUND

With the rapid expansion of markets including notebook computers, tablet computers, mobile phones, televisions, etc., there is a growing demand for displays that are light and have a low energy consumption. Since liquid crystal display (LCD) has such desired features including light weight and low energy consumption, the LCD has been widely used in the above-mentioned products.

Currently, one of the LCD products that has a good transmittance is the twisted nematic (TN) type LCD. However, the transmittance needs to be further improved.

SUMMARY

In accordance with some embodiments of the disclosure, an array substrate, and a related LCD device are provided.

One aspect of present disclosure provides an array substrate. The array substrate can include a plurality of pixel electrodes arranged on a base substrate, and a conductive opaque line arranged between two neighboring pixel electrodes and overlapping with each of the two neighboring pixel electrodes along a width direction of the conductive opaque line.

In some embodiments, the conductive opaque line is closer to the base substrate than the pixel electrodes.

In some embodiments, an overlapping width of an overlapping area of the conductive opaque line and each of the two neighboring pixel electrodes along the width direction of the conductive opaque line is larger than about 0.5 μm.

In some embodiments, an overlapping length of an overlapping area of the conductive opaque line and each of the two neighboring pixel electrodes along a length direction of the conductive opaque line is in a range from about 1 μm to about 2.5 μm.

In some embodiments, the conductive opaque line includes a data line.

In some embodiments, the array substrate can further include a data line over the conductive opaque line. A width of the conductive opaque line is larger than a width of the data line, and an orthographic projection of the conductive opaque line on a bottom surface of the array substrate covers an orthographic projection of the data line on the base substrate.

In some embodiments, the array substrate can further include a common electrode line electrically connected to the conductive opaque line and in a same layer as the conductive opaque line.

In some embodiments, the conductive opaque line is a first metal line. The array substrate further includes a second metal line formed below the first metal line. A width of the first metal line is larger than a width of the second metal line, and an orthographic projection of the first metal line on a bottom surface of the array substrate covers an orthographic projection of the second metal line on the bottom surface of the array substrate.

In some embodiments, the array substrate can further include a thin film transistor electrically coupled to one of the two neighboring pixel electrodes.

In some embodiments, the array substrate can further include a plurality of gate lines in the array substrate extended along the width direction of the conductive opaque line.

In some embodiments, the gate lines and the conductive opaque line are arranged in a same layer. The conductive opaque line includes a plurality of conductive opaque segments arranged in a length direction of the conductive opaque line. Each gate line is extended through a gap between two neighboring conductive opaque segments without contacting the two neighboring conductive opaque segments.

In some embodiments, the plurality of gate lines and the conductive opaque line are arranged in different layers and are electrically insulated from each other.

In some embodiments, the array substrate can further include a resin layer arranged between the conductive opaque line and the pixel electrodes. The resin layer has a thickness larger than about 10000 Å. The resin layer includes a color filter layer.

A common electrode line electrically connected to the conductive opaque line. The common electrode line and the conductive opaque line are in a same layer. A distance between the base substrate and a first portion of the pixel electrodes that covers the common electrode line is smaller than a distance between the base substrate and a second portion of the pixel electrodes that does not cover the common electrode line.

Another aspect of the present disclosure provides an LCD device. The LCD device can include a disclosed array substrate, and an opposite substrate including a plurality of light shielding matrixes. Each light shielding matrix covering a gap between two adjacent pixel electrodes along a length direction of the conductive opaque line. Each light shielding matrix covers a plurality of thin film transistors along the width direction of the conductive opaque line. A gap between two adjacent pixel electrodes along the width direction of the conductive opaque line is uncovered by any of the plurality of light shielding matrixes.

Other aspects of the disclosure can be understood by those skilled in the art in light of the description, the claims, and the drawings of the present disclosure.

BRIEF DESCRIPTION OF THE DRAWINGS

Embodiments of the present disclosure will be described in more detail in connection with the following drawings, in which like reference numerals identify like elements unless otherwise specified. The following drawings are merely examples for illustrative purposes according to various embodiments and are not intended to limit the scope of the present disclosure.

DETAILED DESCRIPTION

Embodiments of the disclosure will be described in detail with reference to the accompanying drawings. The following description is made only by way of example, but does not limit the present disclosure. The drawings are schematic and do not show all of the structural components of the device consistent with the disclosure. Various embodiments of the present disclosure and various features in the embodiments that do not conflict with each other can be combined and rearranged in various ways. Without departing from the spirit and scope of the disclosure, modifications, equivalents, or improvements to the disclosure are conceivable to those skilled in the art and are intended to be encompassed within the scope of the present disclosure.

In accordance with various embodiments, the present disclosure provides an array substrate, and a related liquid crystal display (LCD) device. The disclosed LCD device can include a LCD panel having a larger aperture ratio and a higher transmittance.

Figure 1:
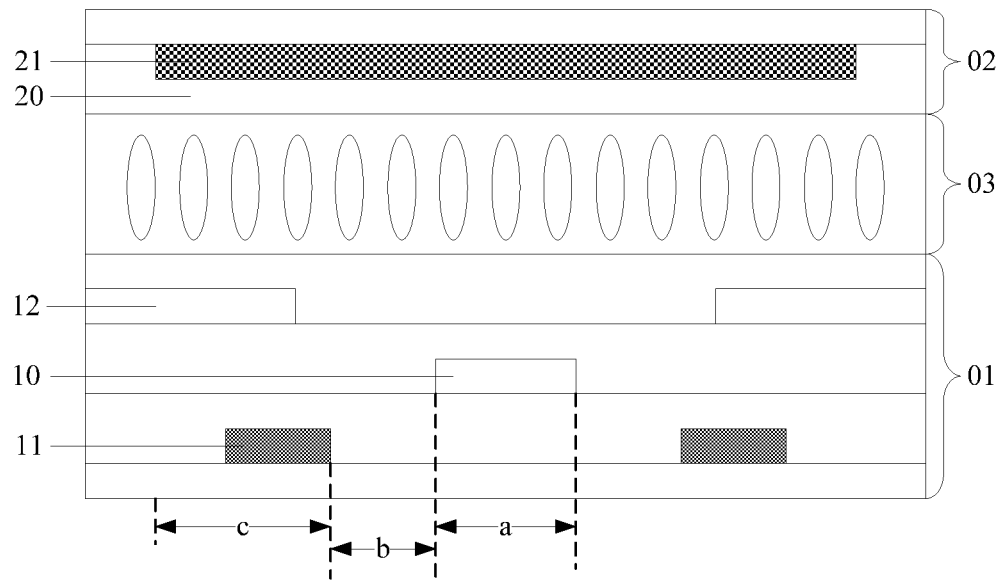
FIG. 1 illustrates a schematic structural view of a TN type liquid crystal display (LCD)

FIG. 1 shows a TN type LCD including an array substrate 01, an opposite substrate 02, and a liquid crystal layer 03 sandwiched between the array substrate 01 and the opposite substrate 02. The array substrate 01 includes a gate line (not shown in the figures), a data line 10, light-shielding strips 11, and pixel electrodes 12 in sub-pixel region regions. The opposite substrate 02 includes a common electrode 20 and a light shielding matrix 21.

A width of the data line 10 in a direction alone the gate line is denoted by a. A distance between the data line 10 and an adjacent light-shielding strip 11 is denoted by b. An alignment accuracy between the array substrate 01 and the opposite substrate 02 is denoted by c. When forming the light shielding matrix 21, a width of the light shielding matrix 21 along the gate line direction needs to satisfy a+2b+2c, which generally needs to be at least 20 μm. This reduces the aperture ratio and the transmittance of the LCD.

Figure 2:
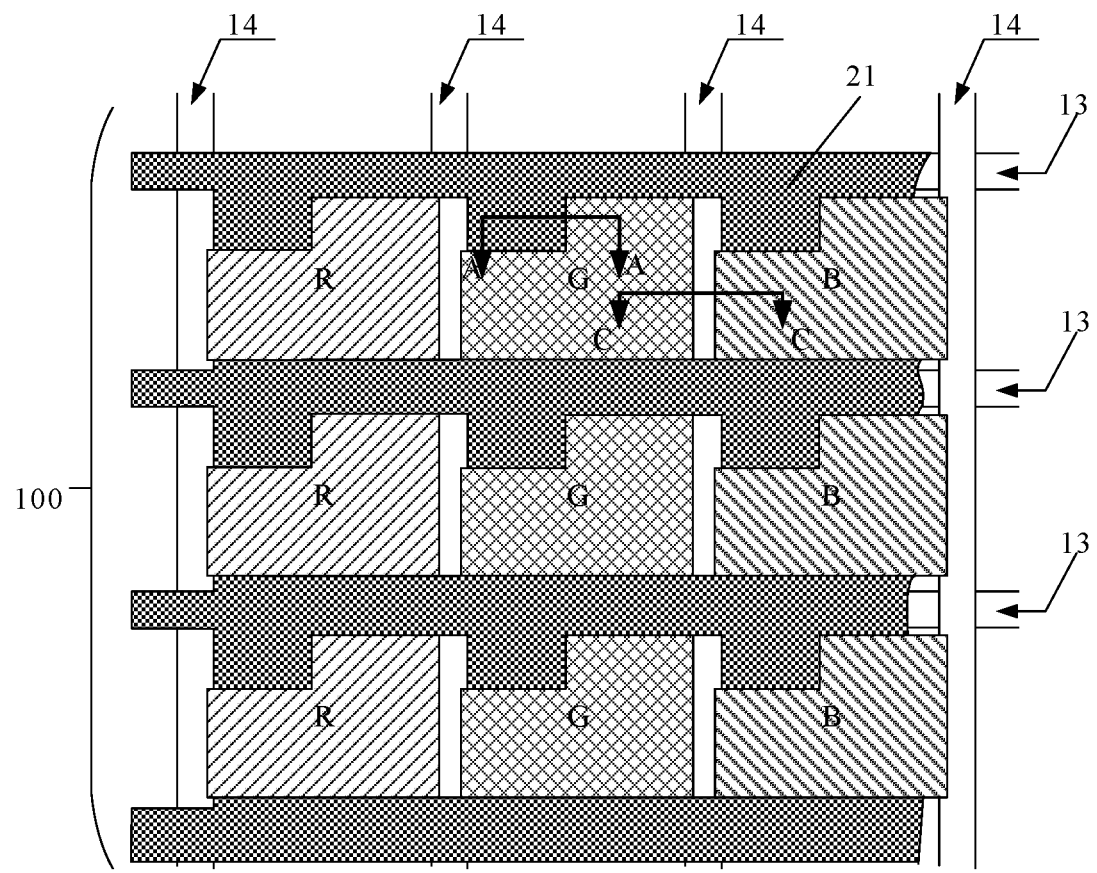
FIG. 2 illustrates a schematic top view of an exemplary LCD panel in accordance with some embodiments of the disclosure.
Figure 3:
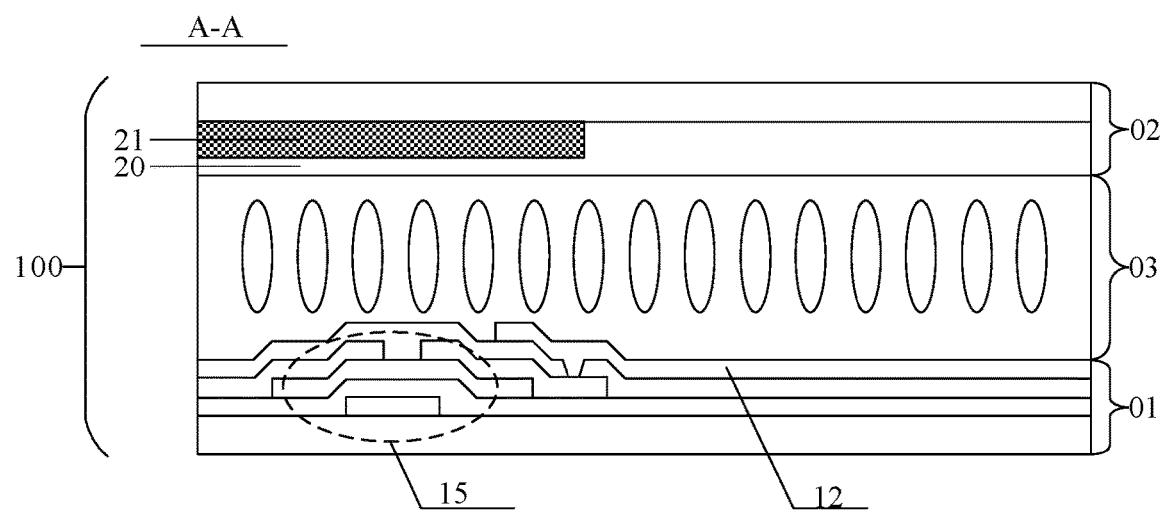
FIG. 3 illustrates a schematic cross-sectional view of the LCD panel shown in FIG. 2 along an A-A line.
Figure 4:
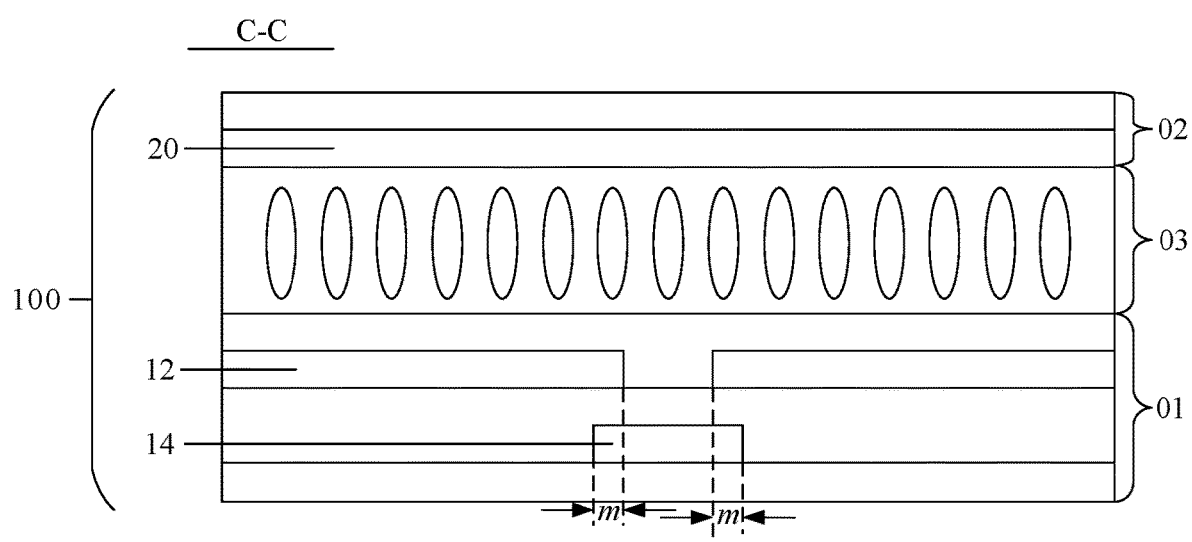
FIG. 4 illustrates a schematic cross-sectional view of the LCD panel shown in FIG. 2 along a C-C line.

FIGS. 2-4 show schematic structural diagrams of an exemplary LCD panel 100 in accordance with some embodiments of the disclosure. FIG. 2 illustrates a schematic top view of the LCD panel 100. FIG. 3 illustrates a schematic cross-sectional view of the LCD panel 100 along an A-A line in FIG. 2, and FIG. 4 illustrates a schematic cross-sectional view of the LCD panel 100 along a C-C line in FIG. 2.

As shown in the figures, the LCD panel 100 includes an array substrate 01, an opposite substrate 02, and a liquid crystal layer 03 between the array substrate 01 and the opposite substrate 02.

The array substrate 01 includes a plurality of gate lines 13 and a plurality of first metal lines 14 disposed crosswise to the gate lines 13. As shown in FIG. 2, the array substrate 01 is divided into a plurality of sub-pixel regions. A shown in FIGS. 3 and 4, a sub-pixel region includes a thin film transistor 15 and a pixel electrode 12. In some embodiments, the pixel electrode 12 can be made of a transparent or non-opaque conducting material, such as indium-tin-oxide (ITO).

The a plurality of first metal lines 14 are arranged along an extending direction of the gate lines 13, also referred to as a "gate line direction," and are respectively disposed between adjacent pixel electrodes 12. In some embodiments, a first metal line 14 overlaps two corresponding adjacent pixel electrodes 12 on both sides. That is, an interval between two adjacent pixel electrodes 12 along the gate line direction is smaller than a length of the corresponding first metal line 14 along the gate line direction. Compared to the first metal lines 14, the pixel electrodes 12 are located closer to the opposite substrate 02.

The opposite substrate 02 includes a common electrode 20 and a light shielding matrix 21. The light shielding matrix 21 includes a plurality of opaque elements. An opaque element of the light shielding matrix 21 can be disposed between adjacent pixel electrodes 12 along an extending direction of the first metal lines 14, also referred to as a "metal line direction." As shown in FIG. 3, the light shielding matrix 21 overlay a thin film transistor 15.

According to the disclosure, the sub-pixels in a pixel can be arranged along any suitable direction. In some embodiments, as shown in FIG. 2 as an example, the sub-pixels in a pixel are arranged in a direction along the gate lines 13. In some other embodiments, the sub-pixels in a pixel can be arranged, for example, in a direction along the first metal lines 14.

The sub-pixels in a pixel can include, for example, a red sub-pixel R, a green sub-pixel G, and a blue sub-pixel. Specifically, for a red sub-pixel R, a red-light filter pattern (not shown in FIGS. 2-4) can be included in a region corresponding to the red sub-pixel. For a green sub-pixel G, a green-light filter pattern (not shown in FIGS. 2-4) can be included in a region corresponding to the green sub-pixel. For a blue sub-pixel R, a blue-light filter pattern (not shown in FIGS. 2-4) can be included in a region corresponding to the blue sub-pixel. The red-light filter patterns, the green-light filter patterns, and the blue-light filter patterns can be either disposed on the array substrate 01 or on the opposite substrate 02.

Further, the positions and the lengths of the first metal lines 14 are not limited to those shown in the figures. The positions and the lengths of the first metal lines 14 shown in FIG. 2 are only examples for illustrating the relative position relationship between the first metal lines 14 and the pixel electrodes 12.

In some embodiments, the first metal lines 14 and the gate lines 13 can be disposed in a same layer. That is, the first metal lines 14 and the gate lines 13 are formed by using a same material and using a same patterning process. In such embodiments, in order to insulate the first metal lines 14 from the gate lines 13, a first metal line 14 can be arranged between adjacent gate lines 13 without contacting with the gate lines 13.

In some other embodiments, as shown in FIG. 1, the first metal lines 14 and the gate lines 13 can be disposed in different layers. Such an arrangement avoids an electrical connection between the gate lines 13 and the first metal lines 14. Therefore, there can be more flexibility in designing the lengths of the first metal lines 14.

The thin film transistor 15 can include a gate electrode, a gate insulating layer, a semiconductor active layer, a source electrode, and a drain electrode. Depending on the material of the semiconductor active layer, the thin film transistor 15 may be, for example, an amorphous silicon thin film transistor, a polysilicon thin film transistor, a metal oxide thin film transistor, or an organic thin film transistor. Further, the thin film transistor 15 may be of, for example, a staggered type, an inverse staggered type, a coplanar type, or an inverted coplanar type.

In the LCD panel 100, a first metal line 14 is arranged between adjacent pixel electrodes 12 along the gate line direction, and overlaps the adjacent pixel electrodes 12 on both sides of the first metal line 14. As a result, light emitted from a backlight source does not pass through the overlapping portions of the pixel electrodes 12 and the first metal line 14. That is, the first metal line 14 can perform a function of a light shielding matrix in terms of blocking light.

Further, compared to the first metal lines 14, the pixel electrodes 12 are disposed closer to the opposite substrate 02. As such, an electric field interference of the first metal lines 14 on edges of the pixel electrodes 12 and the common electrode 20 can be shielded. Therefore, a light leakage problem at the edges of the pixel electrodes 12 in a dark state can be prevented.

Moreover, consistent with the disclosure, the light shielding matrix 21 can be disposed between the adjacent pixel electrodes 12 along the metal line direction, and can be located corresponding to the thin film transistors 15. Therefore, compared to the existing LCD panel, the LCD panel 100 consistent with the disclosure does not have light shielding matrix between adjacent pixel electrodes 12 along the gate line direction. Consequently, the LCD panel 100 has a larger aperture ratio and a higher transmittance as compared to the existing LCD panel.

In addition, since the light-shielding structures between the adjacent pixel electrodes 12 along the gate line direction are provided on the array substrate 01, the light-shielding structures are not affected by the misalignment, if any, between the array substrate 01 and the opposite substrate 02. Thus, the structure of the present disclosure can be implemented in a curved surface LCD panel and can avoid a light leakage problem when viewed from a large viewing angle.

In some embodiments, an overlapping length of a pixel electrode 12 and a neighboring first metal line 14, which is referred to as m as shown in FIG. 4, along the gate line direction can be greater than about 0.5 µm. As a result, the light leakage at the edges of the pixel electrode 12 in the dark state can be prevented.

On the other hand, if the overlapping length between the pixel electrode 12 and the first metal line 14 is relatively large, the aperture ratio and the transmittance of the LCD panel 100 may be affected. Therefore, an upper threshold of the overlapping length between the pixel electrode 12 and the first metal line 14 can be set according to the required aperture ratio and transmittance.

For example, when the requirements of the aperture ratio and the transmittance are relatively strict, an alignment margin of about 1 to 3 µm can be reserved for the upper threshold of the overlapping length in addition to the above-mentioned 0.5 µm. The alignment margin refers to the alignment margin of the pixel electrodes 12 with respect to the first metal lines 14 when the pixel electrodes 12 are formed. Considering the reserved alignment margin, the overlapping length between the pixel electrode 12 and the neighboring first metal line 14 can be, for example greater than about 0.5 µm and less than or equal to about 3 µm.

In some other embodiments, the overlapping length of the pixel electrode 12 and the neighboring first metal line 14 along the gate line direction can be equal to or greater than about 1 µm. In these embodiments, the overlapping length further can be less than or equal to about 2 µm or about 2.5 µm.

Figure 5:
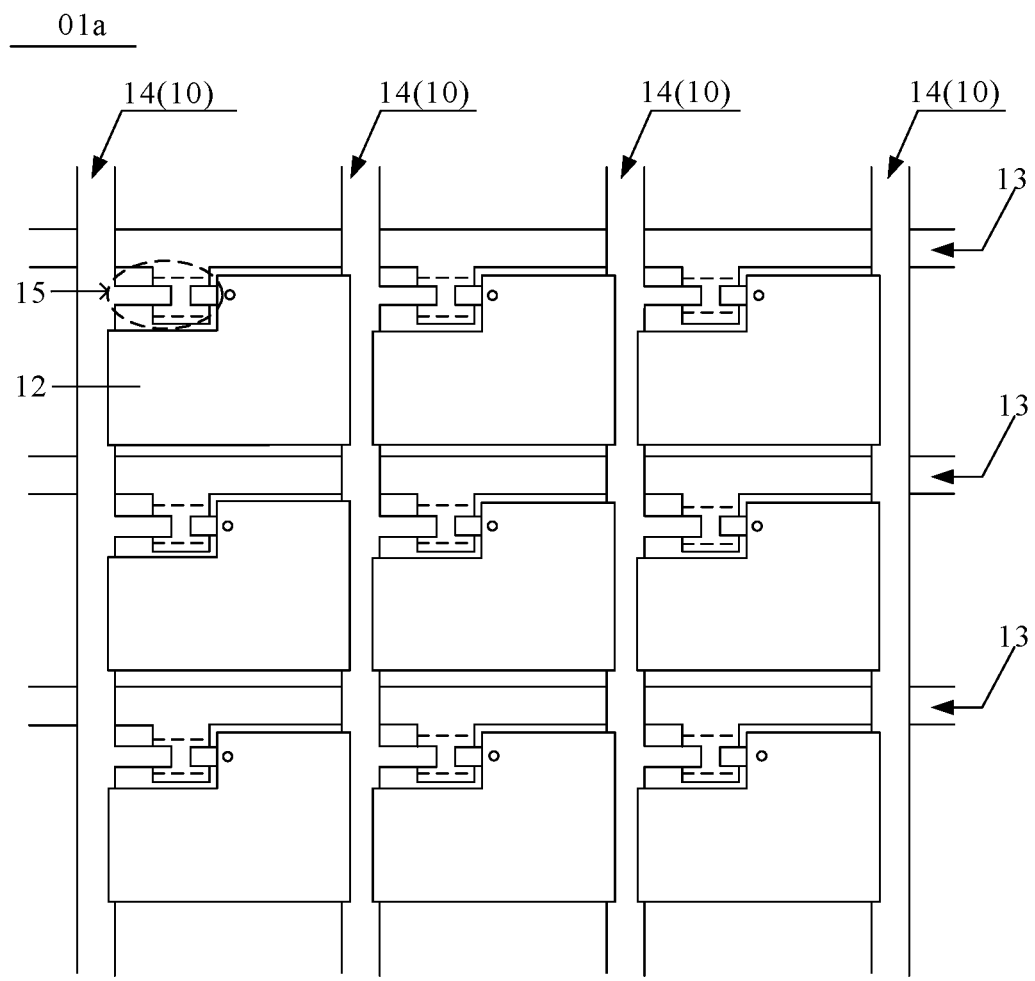
FIG. 5 illustrates a schematic top view of an exemplary array substrate in accordance with some embodiments of the disclosure.

FIG. 5 shows a schematic top view of an exemplary array substrate 01a in accordance with some embodiments of the disclosure. In the embodiment shown in FIG. 5, the first metal lines 14 include data lines 10.

In the array substrate 01a, the first metal lines 14 also function as the data lines 10. Light emitted from the backlight source does not pass through overlapping portions of the pixel electrodes 12 and the data lines 10. Further, the overlapping portions can shield an electric field interference of the data lines 10 on the pixel electrodes 12 and the common electrode 20. As such, the electric field formed at the overlapping portions by the pixel electrodes 12 and the common electrode 20 can be substantially equal to the intermediate electric field which is the electric field at the middle of the pixel. Therefore, a light leakage problem at the edges of the pixel electrodes 12 in a dark state can be prevented.

Figure 6A:
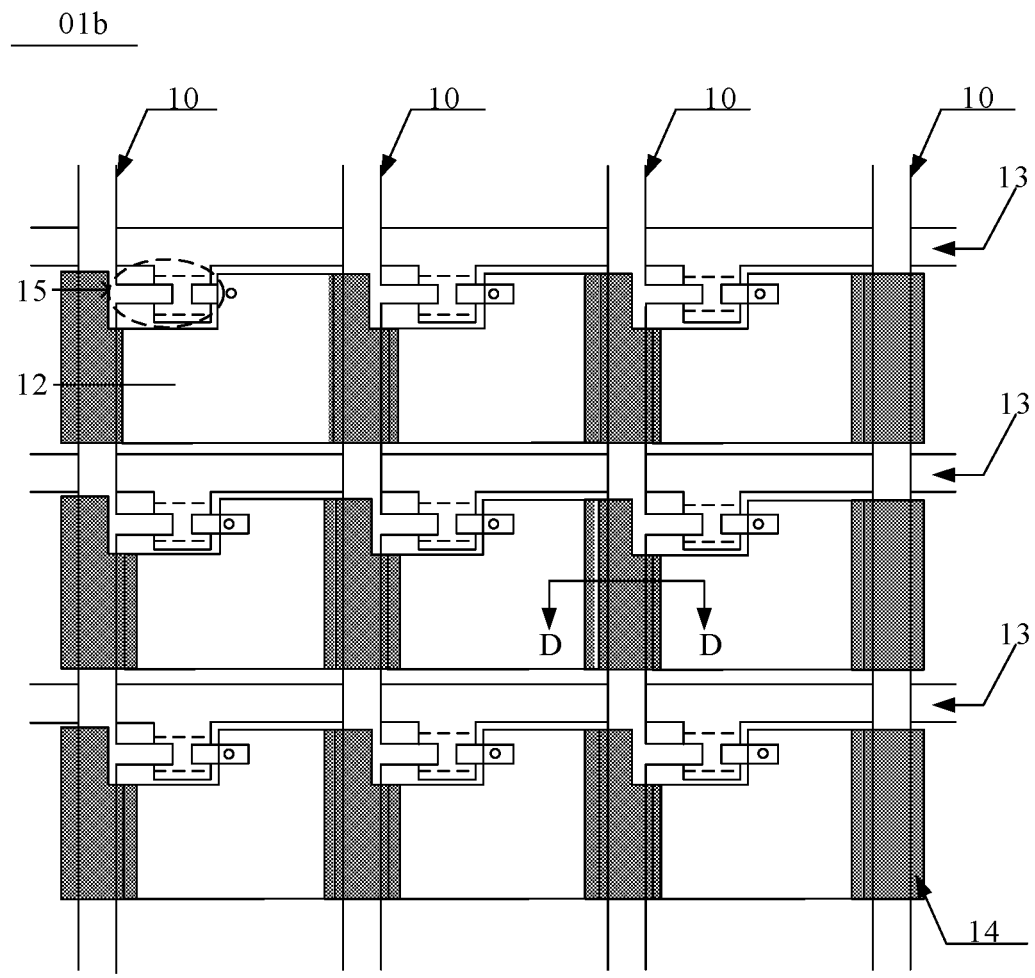
FIG. 6(a) illustrates a schematic top view of another exemplary array substrate in accordance with some other embodiments of the disclosure.
Figure 6B:
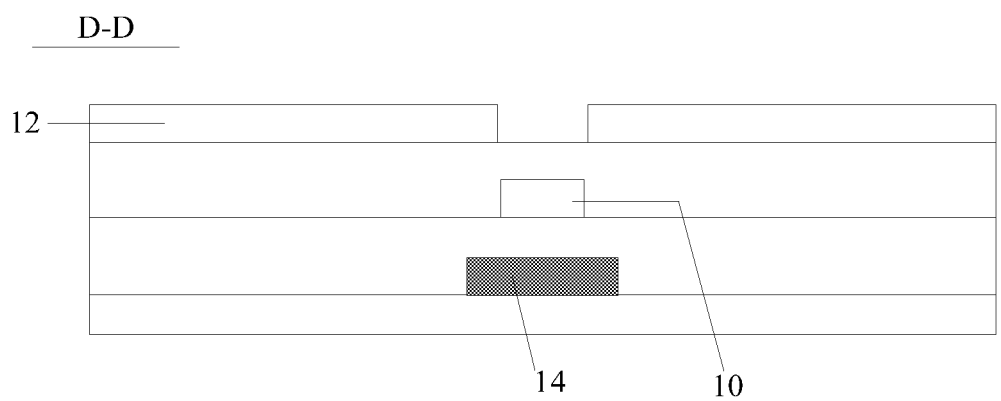
FIG. 6(b) illustrates a schematic cross-sectional view of the array substrate shown in FIG. 6(a) along a D-D line.

In some other embodiments, separate first metal lines 14 and data lines 10 can be provided, as described in more detail below. FIG. 6(a) illustrates a schematic top view of another exemplary array substrate 01b in accordance with some other embodiments of the disclosure, and FIG. 6(b) illustrates a schematic cross-sectional view of the array substrate 01b shown in FIG. 6(a) along a D-D line. As shown in FIGS. 6(a) and 6(b), the array substrate 01b includes separate data lines 10 and first metal lines 14.

As shown in FIG. 6(b), a length of the first metal line 14 along the gate line direction is longer than a length of the data line 10 along the gate line direction. An orthographic projection of the first metal line 14 on a base substrate (not labelled in FIGS. 6(a) and 6(b)) of the array substrate 01b completely covers an orthographic projection of the data line 10 on the base substrate. In other words, an orthographic projection of the first metal line 14 on a bottom surface of the array substrate 01b completely covers an orthographic projection of the data line 10 on the bottom surface of the array substrate 01b.

According to the disclosure, the data lines 10 can be arranged in any suitable way. In some embodiments, one data line 10 can be arranged between each pair of adjacent pixel electrodes 12 along the gate line direction. In some other embodiments, not each pair of adjacent pixel electrodes 12 along the gate line direction have a data line 10 arranged therebetween. For example, one data line 10 can be provided between the first pixel electrode 12 and the second pixel electrode 12, while another data line 10 can be provided between the third pixel electrode 12 and the fourth pixel electrode 12, without data line 10 being provided between the second pixel electrode 12 and the third pixel electrode 12, and so on.

In addition, in a vertical direction along which various layers of the LCD panel are stacked, the data line 10 can be arranged, for example, between the corresponding first metal line 14 and the corresponding pixel electrodes 12, on one side of the first metal line 14 that is away from the pixel electrodes 12, or on one side of the pixel electrodes 12 that is closer to the opposite substrate 02.

As described above, in the array substrate 01b, the length of the first metal line 14 along the gate line direction is longer than the length of the data line 10 along the gate line direction, and the first metal line 14 overlaps the adjacent pixel electrodes 12 on both sides. Therefore, the light emitted by the backlight source does not pass through the edge portions of the electrodes 12 that are close to the data lines 10. Since the length of the data line 10 along the gate line direction is relatively short, even if the data line 10 can affect the edges of the pixel electrodes 12 and the common electrode 20 to cause an electric field interference, a light shielding effect of the first metal line 14 can prevent the light leakage problem at the edges of pixel electrodes 12 in the dark state.

Figure 7:
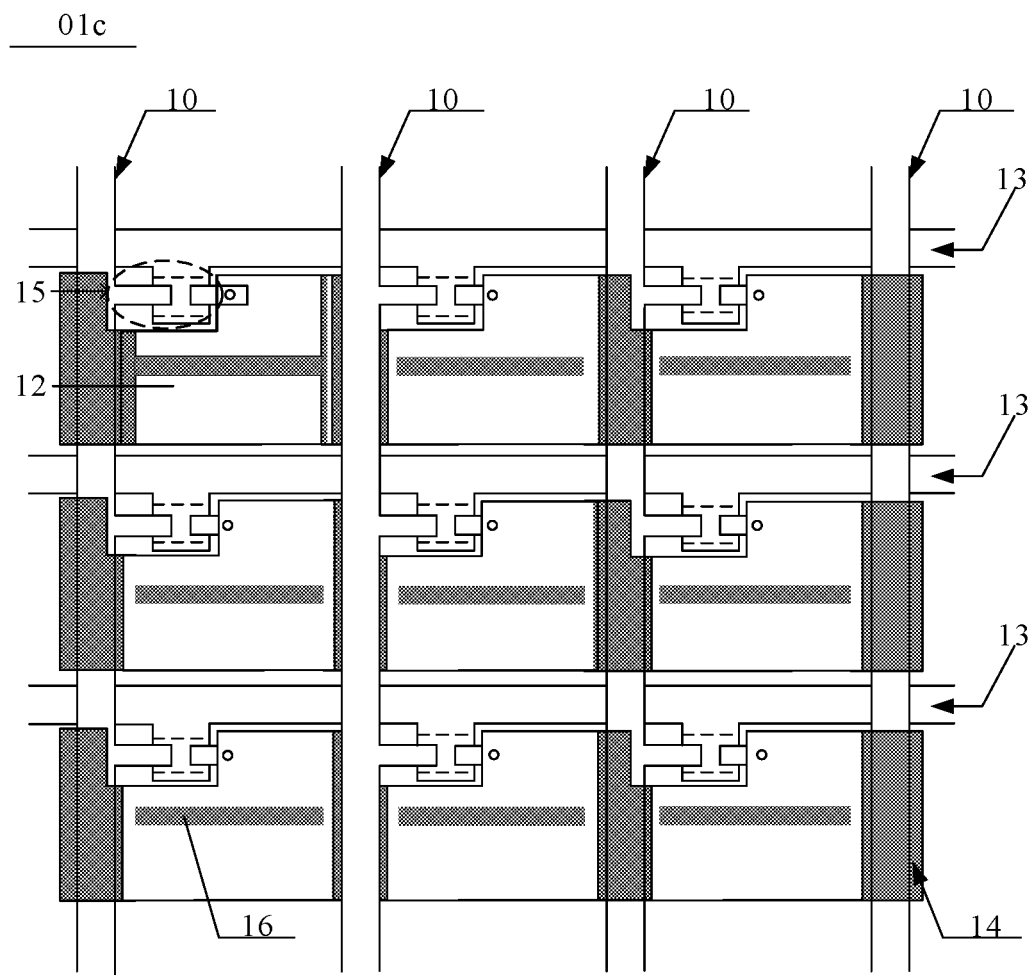
FIG. 7 illustrates a schematic top view of an exemplary array substrate in accordance with some embodiments of the disclosure.

FIG. 7 shows a schematic top view of another exemplary array substrate 01c in accordance with some embodiments of the disclosure. As illustrated in FIG. 7, the array substrate 01c further includes common electrode lines 16.

In some embodiments, the first metal lines 14 are electrically connected to the common electrode lines 16, and the first metal lines 14 and the common electrode lines 16 are formed in a same layer. That is, the first metal lines 14 and the common electrode lines 16 receive same input signals. In these embodiments, the first metal lines 14 and the common electrode lines 16 can be formed using a same one patterning process. In some embodiments, the gate lines 13 parallel to the common electrode lines 16 can also be formed simultaneously when the common electrode lines 16 are formed.

Further, in the scenario that the common electrode lines 16 are close to the gate lines 13, the light shielding matrix 21 on the opposite substrate 02 can correspond to and overlay the common electrode lines 16. On the other hand, in the scenario that the common electrode lines 16 are distant from the gate lines 13, the light shielding matrix 21 on the opposite substrate 02 do not need to cover the common electrode lines 16.

In the array substrate 01c described above, the first metal lines 14 extend along a same direction as the data lines 10, and the common electrode lines 16 extend along a same direction as the gate lines 13. That is, the first metal lines 14 and the common electrode lines 16 form a network structure, which is electrically connected to the common electrode 20. As such, the resistance of the common electrode 20 can be more uniform. Thus, problems such as greenish and flicker caused by uneven resistance of the common electrode 20 can be eliminated.

Figure 8A:
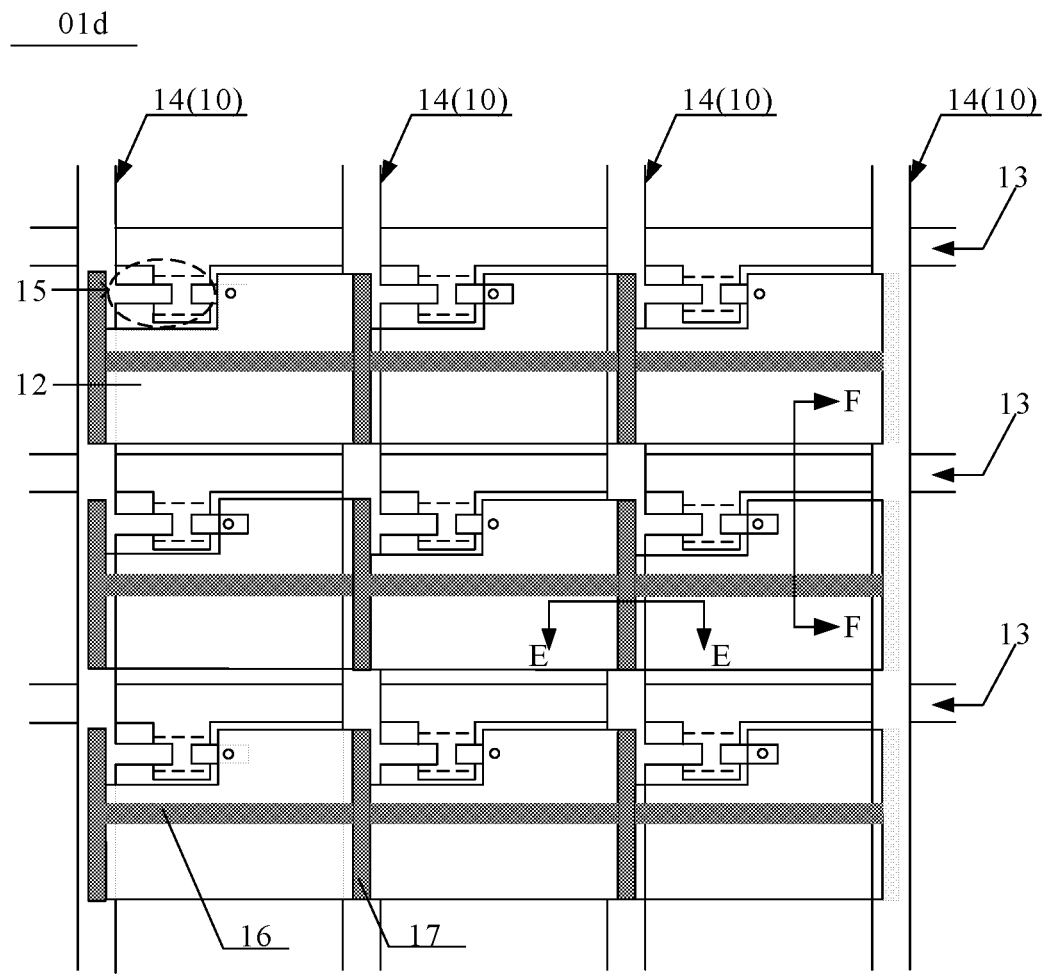
FIG. 8(a) illustrates a schematic top view of another exemplary array substrate in accordance with some other embodiments of the disclosure.
Figure 8B:
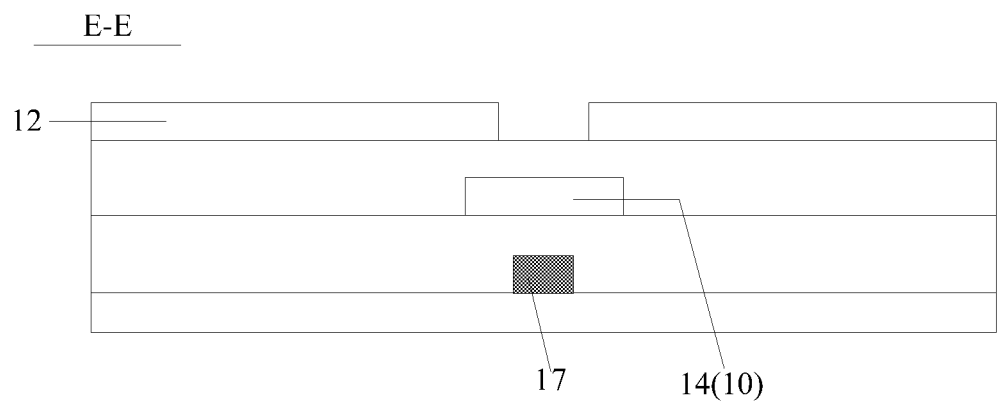
FIG. 8(b) illustrates a schematic cross-sectional view of the array substrate shown in FIG. 8(a) along an E-E line.

FIG. 8(a) illustrates a schematic top view of another exemplary array substrate 01d in accordance with some other embodiments of the disclosure. FIG. 8(b) illustrates a schematic cross-sectional view of the array substrate 01d shown in FIG. 8(a) along an E-E line.

As illustrated in FIGS. 8(a) and 8(b), the first metal lines 14 also serve as the data lines 10. The array substrate 01d further include second metal lines 17 and the common electrode lines 16. As shown in FIG. 8(b), a length of the data line 10 along the gate line direction is longer than a length of the second metal line 17 along the gate line direction. An orthographic projection of the data line 10 on a base substrate (not labelled in FIGS. 8(a) and 8(b)) of the array substrate 01d completely covers an orthographic projection of the second metal line 17 on the base substrate. In some embodiments, the second metal lines 17 are electrically connected to the common electrode lines 16, and the second metal lines 17 and the common electrode lines 16 are formed in a same layer.

In the array substrate 01d, the data lines 10 and the pixel electrodes 12 partially overlap with each other. The overlapping portions can shield the electric field interference of the data lines 10 on the pixel electrodes 12 and the common electrode 20. As such, the electric field formed by the pixel electrodes 12 and the common electrode 20 at the overlapping portions can substantially equal the intermediate electric field. Therefore, the light leakage problem at the edges of the pixel electrodes 12 in the dark state can be prevented.

Further, in the array substrate 01d, the second metal lines 17 extend along a same direction as the data lines 10, and the common electrode lines 16 extend along a same direction as the gate lines 13. Therefore, the second metal lines 17 and the common electrode lines 16 forms a network structure, which is electrically connected to the common electrode 20. As such, the resistance of the common electrode 20 can be more uniform. Thus, problems such as greenish and flicker caused by uneven resistance of the common electrode 20 can be eliminated.

Figure 9:
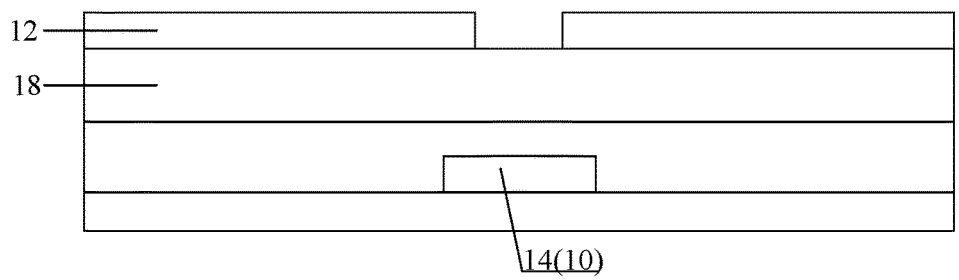
FIG. 9 illustrates a schematic cross-sectional view of an exemplary array substrate in accordance with some embodiments of the disclosure.

FIG. 9 shows a schematic cross-sectional view of another exemplary array substrate 01e in accordance with some embodiments of the disclosure. As illustrated in FIG. 9, the array substrate 01e further includes a resin layer 18 provided between the data lines 10 and the pixel electrodes 12. The resin layer 18 can have a relatively large thickness, such as 10,000 Å or more.

As such, a vertical distance between the pixel electrodes 12 and the data lines 10 can be increased to further reduce the interference of the electric field generated by the data line 10 on the edges of the pixel electrodes 12 and the common electrode 20. The vertical distance between the pixel electrodes 12 and the data lines 10 refers to a vertical distance between a plane in which lower surfaces of the pixel electrodes 12 are located and a plane in which upper surfaces of the data lines 10 are located.

Figure 10:
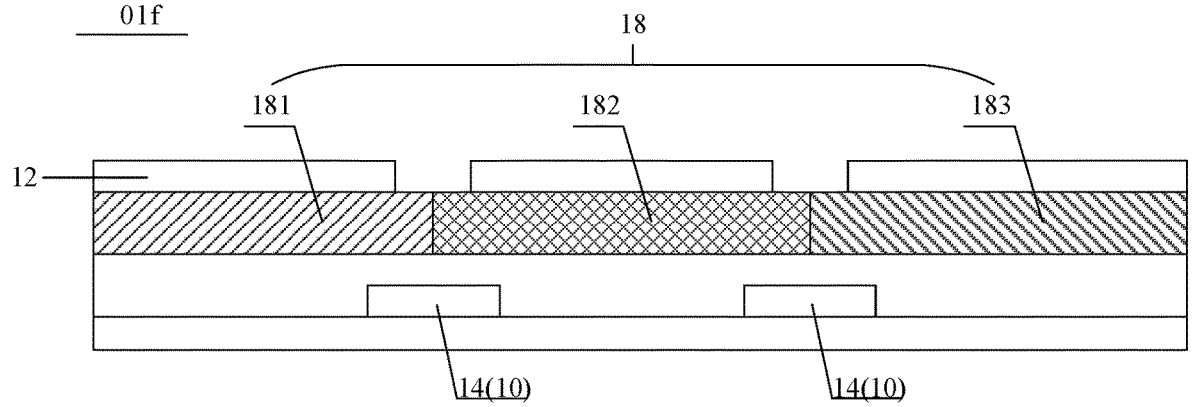
FIG. 10 illustrates a schematic cross-sectional view of another exemplary array substrate in accordance with some other embodiments of the disclosure.

That is, a distance between the base substrate and a first portion of the pixel electrodes that covers the common electrode line is smaller than a distance between the base substrate and a second portion of the pixel electrodes that does not cover the common electrode line FIG. 10 shows a schematic cross-sectional view of another exemplary array substrate 01f in accordance with some other embodiments of the disclosure. The array substrate 01f is similar to the array substrate 01e, except that in the array substrate 01f, the resin layer 18 specifically includes a color filter layer. In some embodiments, as shown in FIG. 10, the color filter layer 18 includes a red-light filter pattern 181, a green-light filter pattern 182, and a blue-light filter pattern 183.

In the embodiment shown in FIG. 10, the color filter layer 18 is formed on the array substrate 01f. This structure can reduce the interference of the electric field generated by the data line 10 on the edges of the pixel electrodes 12 and the common electrode 20, and can eliminate additional processing steps.

Figure 11:
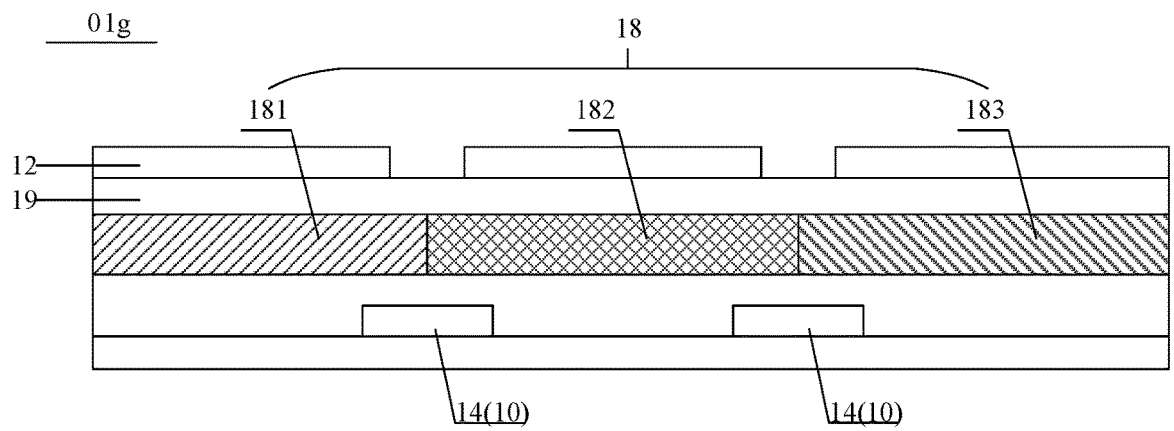
FIG. 11 illustrates a schematic cross-sectional view of another exemplary array substrate in accordance with some other embodiments of the disclosure.

FIG. 11 shows a schematic cross-sectional view of another exemplary array substrate 01g in accordance with some other embodiments of the disclosure. The array substrate 01g is similar to the array substrate 01f, except that the array substrate 01g further includes a planarization layer 19 formed over the red-light filter pattern 181, the green-light filter pattern 182, and the blue-light filter pattern 183, i.e., the planarization layer 19 is formed on a side of the color filter layer 18 that is closer to the opposite substrate 02.

In some embodiments, the red-light filter pattern 181, the green-light filter pattern 182, and the blue-light filter pattern 183 of the color filter layer 18 are formed by three patterning processes, respectively. Thus, the surface of the color filter layer 18 may be uneven, for example, at boundaries between adjacent light filter patterns. The planarization layer 19 can provide a flat surface for the array substrate 01g, and ensure a desired performance of the LCD panel.

In the embodiments described above with reference to FIGS. 10 and 11, since the resin layer 18 is provided between the data lines 10 and the pixel electrodes 12, not only the vertical distance between the pixel electrodes 12 and the data lines 10 is increased, but a vertical distance between the pixel electrodes 12 and the common electrode lines 16 (not shown in FIGS. 10 and 11) is also increased. Thus, the storage capacitance formed between the common electrode lines 16 and the pixel electrodes 12 may be affected. In order to avoid the decreasing of the storage capacitance between the common electrode lines 16 and the pixel electrodes 12, in some embodiments, the vertical distance between the common electrode lines 16 and the pixel electrodes 12 is smaller than the vertical distance between the pixel electrodes 12 and the gate lines 13. The vertical distance between the pixel electrodes 12 and the gate lines 13 refers to a vertical distance from a plane in which the lower surfaces of the pixel electrodes 12 are located to a plane in which upper surfaces of the gate lines 13 are located.

Figure 12:
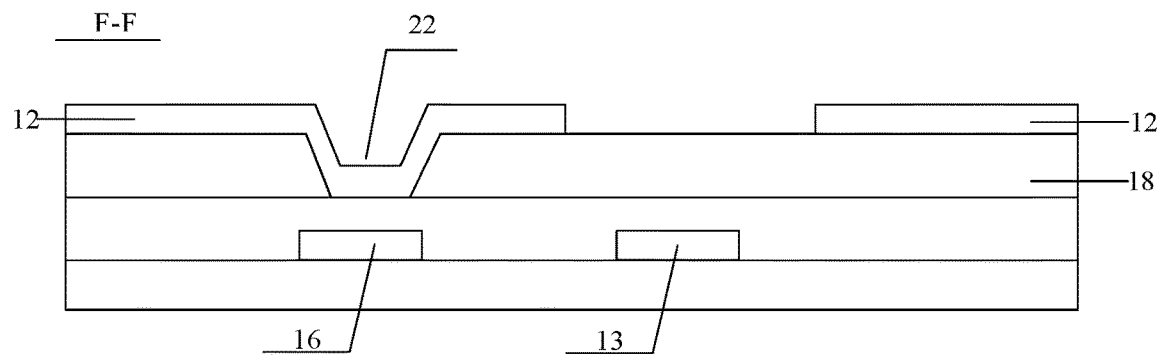
FIG. 12 illustrates a schematic cross-sectional view of an array substrate along an F-F line in FIG. 8(a)

Various configurations can be employed to reduce the vertical distance between the pixel electrodes 12 and the common electrode lines 16. FIG. 12 shows an exemplary array substrate consistent with the disclosure. The array substrate shown in FIG. 12 is an array substrate including the resin layer 18, such as one of the exemplary array substrates described above with reference to FIGS. 9 and 10. The top view of the array substrate shown in FIG. 12 is similar to the top view of the array substrate 01d shown in FIG. 8(a), and is thus omitted. FIG. 12 shows the cross-sectional view of the array substrate cut along a line similar to line F-F in FIG. 8(a).

As shown in FIG. 12, a via hole 22 is formed in the resin layer 18 at a location corresponding to the common electrode line 16. The pixel electrode 12 fills in the via hole 22 and thus the vertical distance between the pixel electrode and the corresponding common electrode line 16 is reduced.

As shown in FIG. 12, the common electrodes 16 and the gate lines 13 are electrically isolated from the pixel electrodes 12 by an insulating layer (not labeled in FIG. 12) separating the common electrode lines 16 and the gate lines 13 from the resin layer 18. Depending on the structure of the thin film transistor 15, the insulating layer can be a gate insulating layer, a passivation layer, or a multi-layer structure including the gate insulating layer and the passivation layer.

Similarly, in the array substrate 01g including the planarization layer 19, a via hole can be formed in both the planarization layer 19 and the resin layer 18 to reduce the vertical distance between the pixel electrodes 12 and the common electrode lines 16.

In some embodiments, the storage capacitance formed by the common electrode lines 16 and the pixel electrodes 12 can be controlled by adjusting the area of the common electrode lines 16. A larger storage capacitance can be obtained with larger common electrode lines 16.

Figure 13:
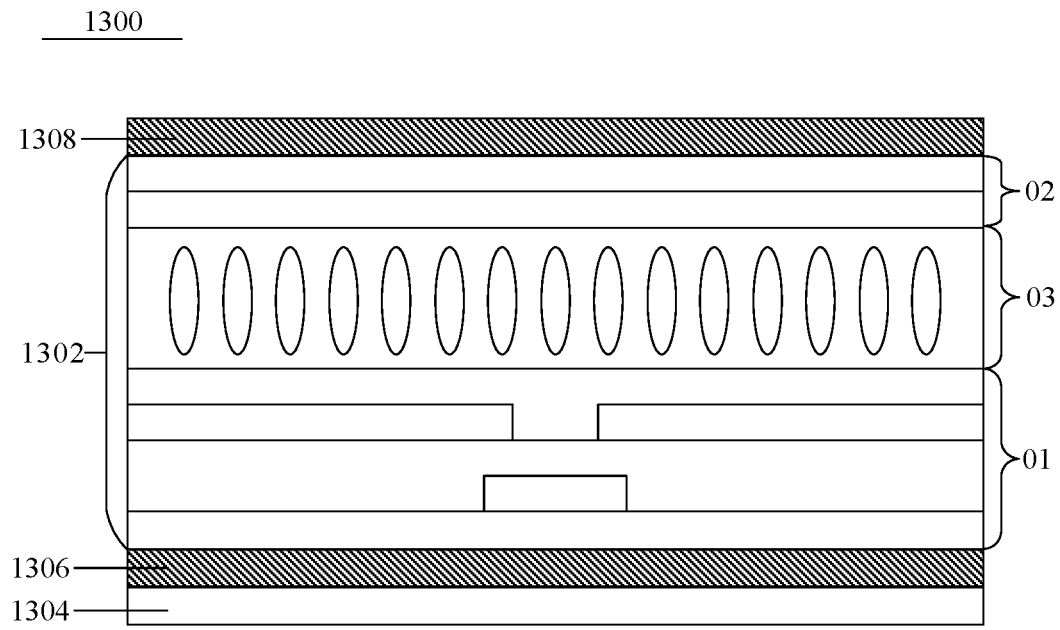
FIG. 13 illustrates a schematic cross-sectional view of an exemplary LCD device in accordance with some embodiments of the disclosure.

FIG. 13 shows an exemplary LCD device 1300 consistent with the disclosure. The LCD device 1300 includes an LCD panel 1302 and a backlight 1304 arranged on a back side of the LCD panel 1302. The LCD panel 1302 can be any LCD panel consistent with the disclosure, such as one of the exemplary LCD panels described above. In some embodiments, as shown in FIG. 13, the LCD device 1300 further includes a lower polarizing plate 1306 disposed on one side of the array substrate 01 and an upper polarizing plate 1308 disposed on one side of the opposite substrate 02.

The LCD device 1300 can be, for example, an LCD screen, an LCD television, a digital photo frame, a mobile phone, a tablet computer, or any suitable product or component having a display function.

Figure 14:
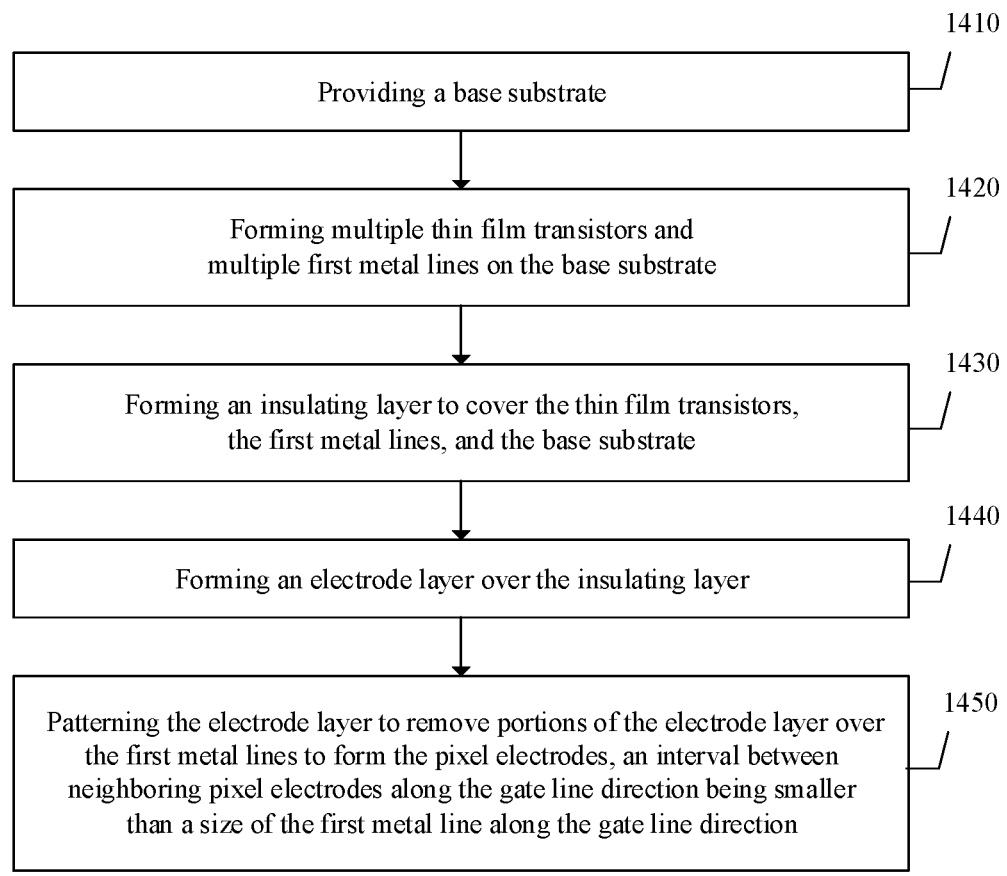
FIG. 14 illustrates an exemplary process flow for making the array substrate shown in FIGS. 2-4 in accordance with some embodiments of the disclosure.

FIG. 14 shows an exemplary process for fabricating an array substrate consistent with the disclosure. In some embodiments, the process can be used to fabricate the array substrate 01 shown in FIG. 4.

As shown in FIG. 14, at 1410, a base substrate is provided. The base substrate can be made of any suitable substrate material.

At 1420, a plurality of thin film transistors and a plurality of first metal lines are formed on the base substrate. In some embodiments, the thin film transistors can be the thin film transistors 15 described above in connection with FIGS. 3, 5, 6(a), 7 and 8(a). The first metal lines can be the first metal lines 14 described above in connection with FIGS. 4-11.

For example, each thin film transistor can be formed to include a gate electrode, a gate insulating layer, a semiconductor active layer, a source electrode, and a drain electrode. The a plurality of first metal lines can be formed along the gate line direction, which is substantially the same as the gate length direction of the thin film transistor as shown in, e.g., FIG. 5.

At 1430, an insulating layer is formed to cover the thin film transistors, the first metal lines, and the base substrate. The insulating layer can be made of any suitable insulating material.

At 1440, an electrode layer is formed over the insulating layer. The electrode layer can be made of any suitable conductive material.

At 1450, the electrode layer is patterned to remove portions of the electrode layer over the first metal lines to form the pixel electrodes. An interval between neighboring pixel electrodes along the gate line direction is smaller than a size of the first metal line along the gate line direction.

Note that, the formed array substrate can be one disclosed array substrate described above, such as the array substrate 01 shown in FIGS. 2-4, the array substrate 01a shown in FIG. 5, the array substrate 01b shown in FIG. 6(a), the array substrate 01c shown in FIG. 7, the array substrate 01d shown in FIG. 8(a), the array substrate 01e shown in FIG. 9, the array substrate 01f shown in FIG. 10, or the array substrate 01g shown in FIG. 11. Other exemplary array substrates can be made in similar manners.

Accordingly, an array substrate and a LCD device are provided.

The array substrate can include a plurality of pixel electrodes arranged on a base substrate, and a conductive opaque line arranged between two neighboring pixel electrodes and overlapping with each of the two neighboring pixel electrodes along a width direction of the conductive opaque line.

The conductive opaque line is closer to the base substrate than the pixel electrodes.

An overlapping width of an overlapping area of the conductive opaque line and each of the two neighboring pixel electrodes along the width direction of the conductive opaque line is larger than about 0.5 µm.

An overlapping length of an overlapping area of the conductive opaque line and each of the two neighboring pixel electrodes along a length direction of the conductive opaque line is in a range from about 1 µm to about 2.5 µm.

The conductive opaque line includes a data line.

The array substrate can further include a data line over the conductive opaque line. A width of the conductive opaque line is larger than a width of the data line, and an orthographic projection of the conductive opaque line on a bottom surface of the array substrate covers an orthographic projection of the data line on the base substrate.

The array substrate can further include a common electrode line electrically connected to the conductive opaque line and in a same layer as the conductive opaque line.

The conductive opaque line is a first metal line. The array substrate further includes a second metal line formed below the first metal line. A width of the first metal line is larger than a width of the second metal line, and an orthographic projection of the first metal line on a bottom surface of the array substrate covers an orthographic projection of the second metal line on the bottom surface of the array substrate.

The array substrate can further include a thin film transistor electrically coupled to one of the two neighboring pixel electrodes.

The array substrate can further include a plurality of gate lines in the array substrate extended along the width direction of the conductive opaque line.

The gate lines and the conductive opaque line are arranged in a same layer. The conductive opaque line includes a plurality of conductive opaque segments arranged in a length direction of the conductive opaque line. Each gate line is extended through a gap between two neighboring conductive opaque segments without contacting the two neighboring conductive opaque segments.

The plurality of gate lines and the conductive opaque line are arranged in different layers and are electrically insulated from each other.

The array substrate can further include a resin layer arranged between the conductive opaque line and the pixel electrodes. The resin layer has a thickness larger than about 10000 Å. The resin layer includes a color filter layer.

A common electrode line electrically connected to the conductive opaque line. The common electrode line and the conductive opaque line are in a same layer. A distance between the base substrate and a first portion of the pixel electrodes that covers the common electrode line is smaller than a distance between the base substrate and a second portion of the pixel electrodes that does not cover the common electrode line.

The LCD device can include a disclosed array substrate, and an opposite substrate including a plurality of light shielding matrixes. Each light shielding matrix covering a gap between two adjacent pixel electrodes along a length direction of the conductive opaque line. Each light shielding matrix covers a plurality of thin film transistors along the width direction of the conductive opaque line. A gap between two adjacent pixel electrodes along the width direction of the conductive opaque line is uncovered by any of the plurality of light shielding matrixes.

The provision of the examples described herein (as well as clauses phrased as "such as," "e.g.," "including," and the like) should not be interpreted as limiting the disclosure to the specific examples; rather, the examples are intended to illustrate only some of many possible aspects.

Further, it is understood that the present disclosure has been made only by way of example, and that numerous changes in the details of embodiment of the disclosure can be made without departing from the spirit and scope of the disclosure. Features of the disclosed embodiments can be combined and/or rearranged in various ways. Without departing from the spirit and scope of the disclosure, modifications, equivalents, or improvements to the disclosure are conceivable to those skilled in the art and are intended to be encompassed within the scope of the present disclosure.

The reference numerals used in the figures may include the following:
01, 01a, 01b, 01c, 01d, 01e, 01f, 01g—array substrate;
02—opposite substrate;
03—liquid crystal layer;
10—data line;
11—light-shielding strip;
12—pixel electrode;
13—gate line;
14—first metal line;
15—thin film transistor;
16—common electrode line;
17—second metal line;
18—resin layer;
100—LCD panel;
181—red-light filter pattern;
182—green-light filter pattern;
183—blue-light filter pattern;
19—planarization layer;
20—common electrode; and
21—light shielding matrix.

What is claimed is:

1. A display panel, comprising:
a plurality of data lines on a base substrate;
a plurality of gate lines crossing over the plurality of data lines;
a plurality of thin film transistors;
a plurality of pixel electrodes respectively connected to the plurality of thin film transistors, the plurality of pixel electrodes on a side of the plurality of data lines away from the base substrate; and
a black matrix on a side of the plurality of pixel electrodes away from the base substrate;
wherein an orthographic projection of the black matrix on the base substrate covers orthographic projections of the plurality of gate lines and the plurality of thin film transistors on the base substrate;
the black matrix is absent in an inter-subpixel region between two adjacent subpixels spaced apart by a respective one of the plurality of data lines;
the black matrix comprises a plurality of black matrix bars;

a respective one of the plurality of black matrix bars comprises a main body and a plurality of extension portions respectively extending away from the main body;

an orthographic projection of the main body on the base substrate overlaps with an orthographic projection of a respective one of the plurality of gate lines;

an orthographic projection of a respective one of the plurality of extension portions on the base substrate overlaps with an orthographic projection of a respective one of the plurality of thin film transistors; and in a region between two adjacent extension portions respectively connected to the main body, an orthographic projection of at least a portion of the respective one of the plurality of data lines is non-overlapping with the orthographic projection of the black matrix on the base substrate; and wherein the region is between the main body and a virtual line intersecting two ends of the two adjacent extension portions away from the main body, in which the black matrix is absent.

2. The display panel of claim 1, wherein, in the inter-subpixel region between the two adjacent subpixels spaced apart by the respective one of the plurality of data lines, an orthographic projection of the respective one of the plurality of data lines on the base substrate overlaps with orthographic projections of two neighboring pixel electrodes on the base substrate along a width direction of the respective one of the plurality of data lines.

3. The display panel of claim 2, further comprising a plurality of common electrode lines, the plurality of common electrode lines being spaced apart from the plurality of data lines by an insulating layer and being between the insulating layer and the base substrate;

wherein, in the inter-subpixel region between the two adjacent subpixels spaced apart by the respective one of the plurality of data lines, the orthographic projection of the respective one of the plurality of data lines on the base substrate covers an orthographic projection of a respective one of the plurality of common electrode lines on the base substrate; and in the inter-subpixel region between the two adjacent subpixels spaced apart by the respective one of the plurality of data lines, a width of the respective one of the plurality of data lines is greater than a width of the respective one of a plurality of common electrode lines.

4. The display panel of claim 1, further comprising a plurality of common electrode lines, the plurality of common electrode lines being spaced apart from the plurality of data lines by an insulating layer and being between the insulating layer and the base substrate;

wherein, in the inter-subpixel region between the two adjacent subpixels spaced apart by the respective one of the plurality of data lines, an orthographic projection of a respective one of the plurality of common electrode lines on the base substrate overlaps with orthographic projections of two neighboring pixel electrodes on the base substrate along a width direction of the respective one of the plurality of common electrode lines.

5. The display panel of claim 4, wherein, in the inter-subpixel region between the two adjacent subpixels spaced apart by the respective one of the plurality of data lines, the orthographic projection of the respective one of the plurality of common electrode lines on the base substrate covers the orthographic projection of the respective one of a plurality of data lines on the base substrate; and in the inter-subpixel region between the two adjacent subpixels spaced apart by the respective one of the plurality of data lines, a width of the respective one of the plurality of common electrode lines is greater than a width of the respective one of a plurality of data lines.

6. The display panel of claim 4, wherein the plurality of common electrode lines and the plurality of gate lines are in a same layer and comprise a same material.

7. The display panel of claim 4, wherein the respective one of the plurality of common electrode lines comprises a plurality of segments, the plurality of segments being arranged along an extension direction of the respective one of the plurality of data lines.

8. The display panel of claim 1, wherein along a direction of the respective one of the plurality of gate lines, orthographic projections of portions of the plurality of data lines on the base substrate and orthographic projections of the plurality of extension portions on the base substrate are alternately arranged and are at least partially non-overlapping.

* * * * *